United States Patent Office 3,044,498
Patented July 17, 1962

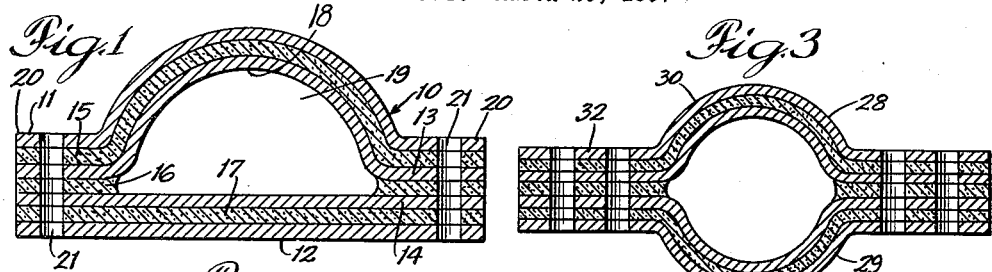
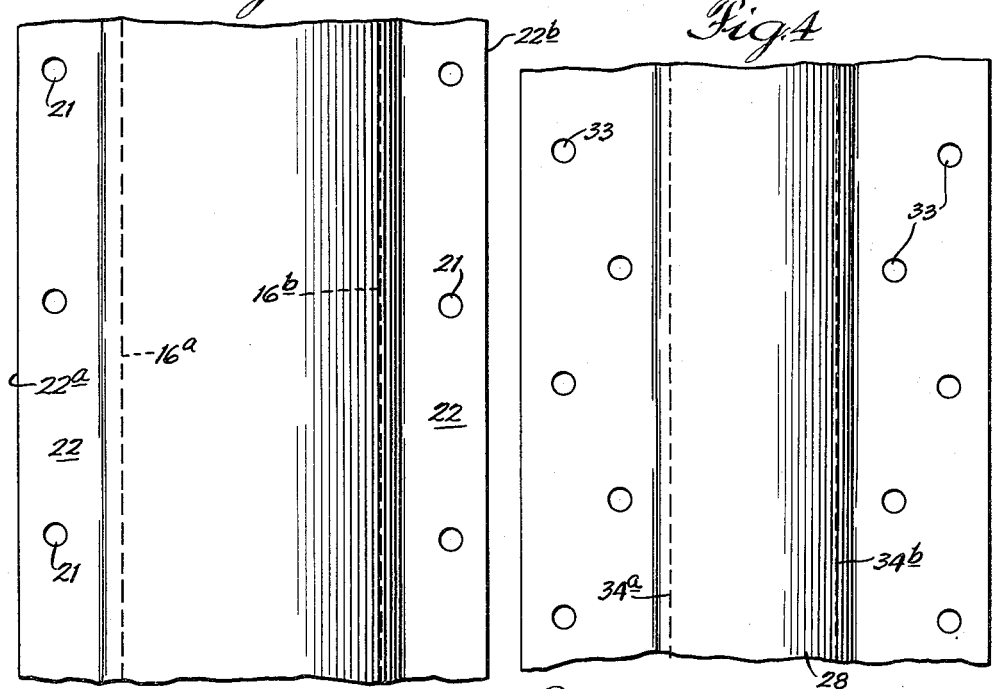
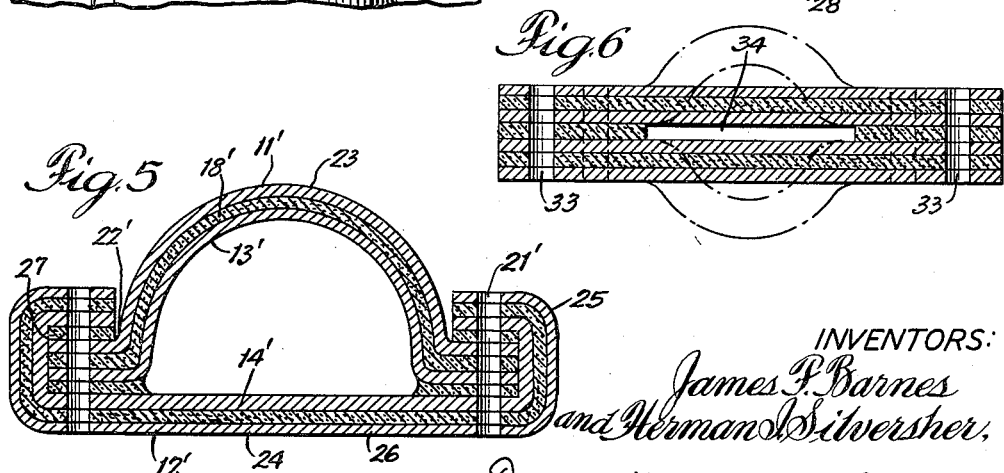

3,044,498
FOIL TUBING
James F. Barnes, Van Nuys, and Herman I. Silversher, Tujunga, Calif., assignors to Foil Process Corporation, Van Nuys, Calif., a corporation of California
Filed Mar. 25, 1957, Ser. No. 648,334
1 Claim. (Cl. 138—143)

This invention relates to a foil tubing, and more particularly to a foil tubing constructed of a plurality of metal foil strips.

Products produce in accordance with this invention will have utility in many applications where metal piping is currently employed. Through the use of our invention, tubing is available of considerably lighter weight than equivalent metal pipe. This lighter weight and the consequent ease of handling are available without sacrificing structural strength and durability. At the same time, the use of products produced in accordance with this invention permits new and convenient ways of securing the tubing which further aid in its ease of handling and installation.

It is, therefore, a general object of this invention to provide a novel type of foil tubing. Another object is to provide a novel type of strip tubing. A still further object is to provide a new foil tubing that is characterized by a high degree of ease and permanency in its installation. Other objects and advantages of our invention will appear as this specification proceeds.

Our invention will be described in conjunction with the accompanying drawing, in which:

FIGURE 1 is a cross-sectional view of one form of our invention relating to foil tubing; FIG. 2 is a fragmentary top view of the tubing shown in FIG. 1; FIG. 3 is a cross-sectional view of another form of our invention embodying metal foil tubing; FIG. 4 is a fragmentary plan view of the tubing shown in FIG. 3; FIG. 5 is a cross-sectional view of a modified form of the tubing shown in FIG. 1; and FIG. 6 is a cross-sectional view similar to FIG. 3 but showing the foil tubing in an intermediate stage of preparation.

The foil tubing of the present invention can be described as a laminated assembly of superimposed metal foil layers or plies having layers or coatings therebetween of a metal-bonding adhesive. The adhesive layer between adjacent foil layers is interrupted between a pair of spaced-apart lines. This permits the adjacent metal foil layers to separate along these lines and thereby provide a tube or channel within the assembly.

Referring now to the drawing, and in particular FIG. 1, the numeral 10 designates generally the foil tubing of our invention. Tubing 10 is made up of superimposed metal foil layers, comprising outer layers 11 and 12, and inner layers 13 and 14. Between the metal foil layers are disposed layers of a metal-bonding adhesive including layers 15, 16 and 17. It will be noted that the central adhesive layer 16 is interrupted between spaced-apart parallel lines 16a and 16b, as indicated in FIG. 2. The portion of the tubing assembly 10 on one side of interrupted layer 16 is deformed outwardly as at 18 to provide a longitudinally-extending passage 19 in tubing 10. In the illustration given, passage 19 is defined by an arcuate top wall, but it will be understood that this wall can have various shapes in cross section, such as rectangular, elliptical, etc.

In the foil tubing structure pictured in FIGS. 1 and 2, it is to be noted that the arcuate portion 18 of tubing 10 is provided with planar portion 20. The planar portion of strip 13 is bonded to strip or sheet 14. Holes 21 extend through tubing 10 transverse to the sheets making up the tubing, and are positioned between spaced parallel lines 16a and 16b and the longitudinal edges 22a and 22b of tubing 10. Holes 21 are adapted to receive various types of securing means, such as nails or screws, depending upon the fastening requirements. Holes 21 may be die-cut, punched, tapped, or the like. When fastening means are inserted into holes 21 and caused to engage and become anchored into a mounting surface which would abut layer 12 (the mounting surface not being shown), the securing means is able to fulfill a double purpose. One purpose which securing means mounted in openings 21 can fulfill is that of positioning the arcuate strips properly upon the flat strips. Another purpose is to anchor the entire tubing assembly 10 in place.

Any of the commercially-available metal foils can be used in producing foil tubing according to the present invention. These include aluminum, lead, tin, Inconel, stainless steel, copper, titanium, brass, etc. For many applications, aluminum foil will be preferred, either alone or in combination with other metal foils. Where internal or external corrosion resistance is desirable, the inner foil layers, the outer foil layers, or both, can be formed of a foil such as stainless steel, Inconel, or titanium foils. Where heat-transferring properties are of importance, the outer metal foil layers can be copper foil, or other metal foil having a high coefficient of heat conduction. The foil layers can range in thickness from 0.25 mil to as great as 5 mils. Both annealed and hard foils can be used, such as annealed and hard aluminum foils, and the annealed and hard foils can be combined.

Various adhesive materials can be employed while still achieving some of the advantages of this invention. Generally, the adhesive should be selected for its capacity to form a strong bond with metals and particularly with aluminum. Suitable adhesives for some purposes include those falling within the classes of thermosetting resin adhesives, thermoplastic resin adhesives, and elastomeric adhesives. The thermosetting resin adhesives are preferred, and particularly the epoxy resin adhesives. Epoxy resin adhesives, on first application and when only partially secured, are flexible and resilient, while being curable by the application of heat to a condition of increased rigidity. Moreover, such adhesives function as good bonding agents whether or not they are completely cured to a rigid, infusable condition. A wide range of properties can be achieved with regard to the product either in its final condition or for intermediate processing operations, as described above.

The epoxy resin adhesives can be applied in the form of liquids, solvent solutions, or for short periods of time as hot solutions (melts), or melted B-stage powders. When the adhesive is used in the form of a solvent solution, the components of the adhesive can be dissolved in the suitable solvent and the solution applied to the foil. If desired, the adhesive solution can be applied to one surface of a foil strip and the solvent evaporated therefrom before the second strip is applied. The advantages of using epoxy resins includes excellent adhesion to clean metal surfaces without complicated surface preparations.

The hardening (or polymerization) mechanism is one of addition rather than condensation. This means that no by-products are formed to interrupt the long chain formations. These can be manifested in the formation of a gaseous pocket. Pressure must be employed to prevent this in laminates using condensation polymerized products, while only a minimum or contact pressure is adequate to produce a good epoxy film. Another advantage of this mechanism is the low shrinkage factor that does not tend to distort the desired structural dimensions.

One particularly suitable adhesive consists of the reaction product of an epoxy resin and a polyamide. These components can be heated individually to a temperature of 90 to 100° C. to soften them, then mixed and applied. Reaction between the two components gives a cross-linked polymer having characteristics of hardness and flexibility in curing time which vary with the mixing proportions and temperature or curing. Usually about a 65—35 mixture of epoxy resin and polyamide gives good results. These components can be dissolved in methylethyl ketone or toluene, xylene, or comparable solvents for application as solvent solutions. Among the commercially available epoxy adhesives which may be mentioned are the Epon adhesives VI and VII of Shell Chemical and the Araldite adhesives AN-101 and AN-104 of Ciba. However, the preferred adhesives for this invention are not limited to those prepared from the interaction of epoxy resins and polyamides. They may also be made by reacting epoxy resins with amine hardeners and cross-linking agents. These in the main are the polyamines of various molecular weights as ethylenediamine, phenylenediamine, etc. Mixtures of polyamines and diamines can also be used.

A specific example of a thermosetting epoxy resin adhesive suitable for use in the present invention is formulated as follows: 60 parts by weight of Epon 1001 is dissolved in 30 parts of toluol and 30 parts of methylethyl ketone. A second mixture is formed from 32 parts of Polyamide 115, 11 parts toluol, and 3 parts butanol. 120 parts of the first mixture combined with 46 parts of the second mixture to form an epoxy resin adhesive solution contains 55.4% solids. This adhesive was used as is, but it can be thinned to a different consistency with a mixture of 5 parts toluol and 1 part butanol. If faster drying is desired, additional quantities of methylethyl ketone can be added. In the 55.4% solids concentrate the adhesive mixture has a pot-life in excess of 12 hours and this can be increased by adding additional quantities of solvents. Epon 1001 is an epoxy resin manufactured by Shell Chemical Company, which has an epoxide equivalent of 450 to 525. Polyamide 115 is a condensation product of dilinoleic acid and ethyldiamine produced by General Mills.

As a specific example of a phenolic thermosetting resin adhesive which can be used in the practice of the present invention, the following is illustrative: 100 parts of Plyophen 169 is combined with 100 parts by weight of a 10% solution of Butvar B-76 in methylethyl ketone. Plyophen 169 is a phenolformaldehyde resin manufactured by Reichhold Chemicals, of White Plains, New Jersey. The product contains 64 to 68% solids, the resin being dissolved in methanol. Butvar B-76 is a polyvinyl butyral resin in a 10% solids solution in methylethyl ketone. It is manufactured by the Monsanto Chemical Company. If desired, Paracril CV can be substituted for Butvar B-76. Paracril CV is rubbery solid butadiene-acrylonitrile copolymer manufactured by the Naugatauk Chemical Company, of Naugatauk, Connecticut. As modifiers for the phenolformaldehyde, soluble nylon or neoprene rubber can be used. Also, the Formvar resins can be substituted for all or part of the Butvar B-76. The Formvar resins are produced by the Shawinigan Chemical Company, of Springfield, Massachusetts.

In manufacturing tubing according to the present invention, various procedures can be followed. In one procedure, two pairs of strips are first united with a metal-bonding adhesive. One pair of strips is deformed to provide the structure shown in the upper half of the assembly in FIG. 1, and then the two pairs are united by a metal-bonding adhesive substantially as shown in 16 in FIG. 1. Holes 21 can then be drilled into the assembly. Where stiffening of the lower portion of the assembly in FIG. 1 is desirable, one of the plies in that portion can be made of a harder or more rigid metal foil. In such case, either strip 12 or 14 may be of the harder or more rigid foil. The deforming operation can be readily performed through the use of dies and molds, or other types of shaping equipment. In the above-described process, the adhesive bonding layers would be in a flexible and deformable state and would not be completely cured. In other words, the flat strips constituting the upper part of the assembly in FIG. 1 would have semicircular recesses formed therein, while the laminated assembly was in a soft, flexible condition. After assembly, the completed structure as shown in FIG. 1 can be cured.

*Example I*

A tubing assembly like that shown in FIGS. 1 and 2 of the drawing can be produced in the following manner: Four sheets of aluminum foil of a thickness of about 4 mils are employed, three of which are annealed, and one of which is hard aluminum foil. These strips are grouped into pairs and united with a phenolic-polyvinyl butyral adhesive formulation. A commercial example of such an adhesive is Bloomingdale's FM-47, which is manufactured by Bloomingdale Rubber Company, of Chester, Pennsylvania. In this procedure, the two annealed aluminum strips are bonded together and a hard aluminum foil strip is bonded to the third annealed aluminum foil strip. In one embodiment of our invention, these strips are about four feet long. The two annealed strips that are united together have a width of about 3 inches, while the third annealed aluminum strip and the hard aluminum foil strip have a width of about 2½ inches. The two-ply assembly of the 3″ wide annealed aluminum strips is then formed in a die to include a longitudinal recess in semicircular cross section having a diameter of about 1″. Additional adhesive is applied to the flat or planar surfaces of the recess-provided laminate. The two laminates are then united and four ¼″ holes are drilled into each of the laterally-extending flanges 22. The assembly thus effected was cured by residence in a 300° F. oven for 10 minutes. Four assemblies identical to that described above were nailed to a wall in vertical alignment to provide a conduit of approximately 16 feet long. This conduit has been successfully employed for conducting water and has shown remarkable resistance to deformation, both from changes in water flow and from externally-applied stresses.

*Example II*

Tubing of the structure constructed according to the teaching of Example I was produced, but employing four copper foil strips. Two of the strips had dimensions of 4 feet long by 3″ wide, while the two remaining strips were 4 feet long by 2½″ wide. The 2½″ wide strips were bonded together with the phenolic elastomeric adhesive specified in Example I. This two-ply laminate formed the flat or lower part of the tubing assembly shown in FIG. 1. The remaining two strips of copper foil, having widths of 3″, were also united with the same phenolic elastomeric adhesive and subjected to a die-stamping deformation. The deformation produced a semicircular ridge extending longitudinally of the strips and having a diameter of about 1″. The united strips then had a width of about 2½″ and were united to the previously provided two-ply, flat laminate. Four ⅛″ diameter holes (designated 21 on the drawing) were tapped into each laterally-extending flange 22. The completed assembly was then cured as set forth in Example I above.

Example III

A tubing structure like that shown in FIGS. 1 and 2 and produced by the foregoing examples was constructed in the following manner: One sheet of 2½" wide by 48" long stainless steel having a thickness of 2 mils was adhesively bonded to a similarly dimensioned annealed aluminum strip. Two annealed aluminum strips, each 3" wide by 48" long and having a thickness of 3 mils were adhesively bonded together. The adhesive employed to bond the two aluminum foil strips together had the following formulation:

| Ingredients: | Parts by weight |
| --- | --- |
| Epon 1001 | 30 |
| Polyamide 115 | 16 |
| Methylethyl ketone | 15 |
| Toluol | 20 |
| Butanol | 1.4 |

The adhesive employed for bonding the stainless steel foil to the aluminum foil had a slightly different formulation. This adhesive consisted of 83.4 parts of the epoxy-polyamide adhesive solution described above, combined with 20 parts of Butvar B-76. The two-ply laminate of annealed aluminum foil strips having a width of 3" was then deformed as described in the foregoing examples. The deformed laminate was then provided with a layer of the epoxy-polyamide adhesive solution described above and united with the aluminum foil sheet of the 2½" wide two-ply laminate, the stainless steel sheet thereby being the outer backing portion of the assembly.

In another aspect of our invention, we produce the tubing structure shown in FIG. 5. Referring now to FIG. 5, it is to be seen that the tubing includes an upper deformed portion 23 and a lower portion having parts folded on themselves and generally designated 24. In the embodiment shown in FIG. 5, both portions 23 and 24 are shown to include two metal plies. However, it is to be appreciated that in this embodiment, as well as the other aspects of our invention, more or less plies can be employed as the intended usage might dictate. In FIG. 5, the upper portion 23 of the tubing is essentially similar to that shown in FIG. 1, including two metal strips 11' and 13' united together by a layer of adhesive 18'.

The lower part 24 of the tubing assembly shown in FIG. 5 has longitudinal end portions 25 folded inwardly over the main base portion 26 to form a channel 27, into which laterally-extending flange portions 22' are received. Holes 21' are provided in the laterally-extending portions, substantially as shown in FIGS. 1 and 2.

As an example of this aspect of our invention, the following can be set forth:

Example IV

Four foil strips were provided. Two of these strips were constructed of annealed aluminum foil of a length of 48". One annealed aluminum foil strip had a width of 3", which eventually became layer 11', and the other annealed aluminum foil strip had a width of 4", which eventually became layer 12'. Two stainless steel strips were provided. The dimensions of the stainless steel foil strips corresponded to the annealed aluminum foil strips mentioned above, i.e., both being 48" in length, but one being 3" wide while the other was 4" wide. The 3" wide stainless steel strip assumed the position 13' in FIG. 5, while the 4" strip assumed the position 14' in FIG. 5. The 3" strips were bonded together with the epoxy-polyamide adhesive mentioned above, as modified with Butvar B-76. The same adhesive was employed to unite the 4" strips. The 3" wide laminate was then deformed to assume the configuration designated 23 in FIG. 5, the stainless steel layer being inward of the semicircular longitudinally-extending recess. Adhesive was applied to both sides of the laterally-extending flange 22' and the 4" wide strips, now laminated, were brought into contiguous relation with element 23 and the longitudinal edges of laminate 24 were bent upon themselves to include flanges 22'. The assembly was then cured for 10 minutes at 300° F. and provided with four ⅛" drilled holes in each laterally-extending flange, the flange now including six metal layers. In use, we have found this structure to possess even greater resistance to deformation, since the folded-over portions of part 24 act as abutments for any tendency of part 23 to flatten.

In another aspect of our invention, a substantially circular passage can be provided in laminated foil tubing. This is illustrated in FIGS. 3 and 4. The structure of the tubing shown in FIG. 3 is seen to include upper and lower portions designated 28 and 29, respectively. Each portion may include one or more metal layers bonded together with a metal-bonding adhesive. The parts 28 and 29 can be constructed on the same forming machine so that the semicircular longitudinal recesses 30 and 31 will match each other upon assembly. As in the case of the previously described embodiments of our invention, the laterally-extending flanges 32 are provided with holes 33 extending transversely therethrough.

This particular embodiment of our invention permits a novel method of installation. In this novel method of installation, we provide the structure that eventually will be deformed into FIG. 3 in the form shown in solid line in FIG. 6. In FIG. 6, the deformed portions 30 and 31 are not yet provided, but a layer of adhesive between adjacent metal foil strips is interrupted along spaced parallel lines designated 34a and 34b. The laminate assembly of the structure of FIG. 6 can be conveniently shipped to the site of installation. There, it can be anchored in place by securing means extending through holes 33 on one of the laterally-extending flanges 32. Thereafter, one end of the tube structure is closed and hydrostatic pressure applied to the space 34 provided by the interrupted layer which causes the upper and lower portions 28 and 29 to become outwardly deformed and assume the configuration shown in FIG. 3.

As illustrative of this aspect of our invention, the following example may be set forth:

Example V

Four strips of annealed aluminum foil each 48" long by 4" wide were provided. Two separate laminates of two strips each were constructed. The adhesive employed to make up the laminates was the epoxy-polyamide adhesive described above. The two laminates thus achieved were then united by a similar adhesive, leaving a longitudinal interruption in the adhesive of about 1" in width. Transverse holes were drilled through the assembly substantially as shown in FIG. 4 and designated 33. The assembly was then transferred to the site of installation and was nailed in place by inserting nails through the holes in one of the flanges 32. Thereafter, hydrostatic pressure was internally applied to the laminate and the portions 28 and 29 deformed into the configuration shown in FIG. 3.

The foregoing detailed description has been given for clearness of understanding only, and no unnecessary limitations are to be inferred therefrom.

We claim:

Foil tubing, comprising a laminated assembly of superimposed metal foil layers having layers therebetween of a metal bonding adhesive, one of said adhesive layers being interrupted along a pair of spaced-apart, parallel lines to provide a channel within said assembly, at least the part of said assembly on one side of said interrupted adhesive layer being deformed away from said layer between said spaced-apart parallel lines, the edge portions of one of the parts of said assembly on one side of said adhesive layer being folded on themselves to overlap the corresponding edge portions of the part of the assembly on the other side of said adhesive layer, and a plurality of holes extending through said assembly transverse to said metal foil strip layers, said holes being located outside of the said pair of spaced-apart parallel lines, said folded portions also being equipped with holes aligned with said first-mentioned holes, whereby securing means can be extended through said holes for anchoring said tubing to a supporting surface.

References Cited in the file of this patent

UNITED STATES PATENTS

| | | |
|---|---|---|
| 315,565 | Speer | Apr. 14, 1885 |
| 406,332 | Bayles | July 2, 1889 |
| 1,930,285 | Robinson | Oct. 10, 1933 |
| 1,954,638 | Loeffler | Apr. 10, 1934 |
| 2,303,778 | Wesley | Dec. 1, 1942 |
| 2,341,398 | Strother et al. | Feb. 8, 1944 |
| 2,396,522 | Modine | Mar. 12, 1946 |
| 2,464,487 | Chappell et al. | Mar. 15, 1949 |
| 2,529,884 | Reynolds | Nov. 14, 1950 |
| 2,581,778 | Young | Jan. 8, 1952 |
| 2,711,982 | Straka | June 28, 1955 |
| 2,768,920 | Stout | Oct. 30, 1956 |
| 2,798,510 | Martin et al. | July 9, 1957 |
| 2,910,094 | Barnes et al. | Oct. 27, 1959 |
| 2,914,091 | Barnes et al. | Nov. 24, 1959 |

FOREIGN PATENTS

| | | |
|---|---|---|
| 262,142 | Great Britain | Oct. 6, 1927 |